United States Patent
Nylund

[11] Patent Number: 5,875,223
[45] Date of Patent: Feb. 23, 1999

[54] SPACER FOR A NUCLEAR FUEL ASSEMBLY AND A NUCLEAR FUEL ASSEMBLY

[75] Inventor: Olov Nylund, Västerås, Sweden

[73] Assignee: ABB Atom AB, Vasteras, Sweden

[21] Appl. No.: 841,400

[22] Filed: Apr. 30, 1997

[30] Foreign Application Priority Data

May 2, 1996 [SE] Sweden .................................. 9601673

[51] Int. Cl.⁶ .................................................. G21C 3/344
[52] U.S. Cl. ........................................... 376/439; 376/442
[58] Field of Search .................................. 376/438, 439, 376/441, 442, 443, 462

[56] References Cited

U.S. PATENT DOCUMENTS

| | | | |
|---|---|---|---|
| 4,900,508 | 2/1990 | Anthony | 376/438 |
| 5,331,679 | 7/1994 | Hirukawa | 376/439 |
| 5,434,898 | 7/1995 | Barkhurst | 376/438 |
| 5,666,389 | 9/1997 | Andersson et al. | 376/442 |

FOREIGN PATENT DOCUMENTS

| | | |
|---|---|---|
| 0 674 321 | 9/1995 | European Pat. Off. . |
| 1 514 469 | 9/1969 | Germany . |
| WO 95/34899 | 12/1995 | WIPO . |

*Primary Examiner*—Daniel D. Wasil
*Attorney, Agent, or Firm*—Pollock, Vande Sande & Priddy

[57] ABSTRACT

A spacer for retaining and positioning elongated elements at one or a plurality of levels in a nuclear reactor fuel assembly comprises a grid structure of joined-together sleeve cells. A coolant is adapted to flow upwards through the fuel assembly. The majority of the sleeve cells are provided with an upstream edge with a waveform. The edge is waveformed in such a way that the upwardly flowing coolant first encounters a peak of the wave which is disposed between the joints of the sleeves and thereafter a valley of the wave which is disposed at the joints of the sleeves. The peaks are arranged closer to a center of the sleeve cell than the valleys. Between the peaks and valleys, oblique edges are formed.

4 Claims, 3 Drawing Sheets

SPACER FOR A NUCLEAR FUEL ASSEMBLY AND A NUCLEAR FUEL ASSEMBLY

TECHNICAL FIELD

The present invention relates to a design of a spacer for retaining elongated elements in a fuel assembly for a light-water nuclear reactor. More particularly, the invention relates to the design of a spacer sleeve for such a spacer.

BACKGROUND OF THE INVENTION

A fuel assembly in a boiling water nuclear reactor comprises a long tubular container, often with rectangular or square cross section, which is open at both ends forming a continuous flow passageway, through which the coolant of the reactor may flow. The fuel assembly comprises a large number of equally long tubular fuel rods, arranged in parallel in a certain definite, normally symmetrical pattern. The fuel rods are retained at the top by a top tie plate and at the bottom by a bottom tie plate. To allow coolant to flow past the fuel rods in the desired way, it is important that these be spaced from each other and prevented from bending or vibrating when the reactor is in operation. For this purpose, a plurality of spacers are used, distributed along the fuel assembly in the longitudinal direction.

A fuel assembly for a pressurized-water nuclear reactor has, in principle, the same construction as a fuel assembly for a boiling water nuclear reactor, except that the fuel rods are not enclosed by some tubular container and that the number of fuel rods is larger.

In connection with repair and service of a nuclear reactor, foreign matter may enter the coolant. The foreign matter then moves with the coolant which is circulated in the reactor core. The foreign matter may consist of metal chips or pieces of metal wire. In those cases when the foreign matter adheres to the spacers or to other locations in the fuel assembly, it may give rise to wear damage on the elongated elements. The wear damage may have serious consequences, especially if it occurs on parts which are particularly fragile such as the fuel rods. This may be the case if the debris adheres to a spacer such that, because of the upwardly-flowing coolant, it is set into vibration thus wearing against one or more of the fuel rods which are positioned by the spacer.

To avoid damage of the above kind, it is known to design various forms of debris-capturing means which are intended to be arranged below the fuel assembly in such a way that the coolant is forced to pass therethrough before it is passed into the fuel assembly. By arranging debris-separating means in this way, the main part of the foreign matter is prevented from entering the fuel assembly proper.

A disadvantage with additional parts introduced in a fuel assembly is that they almost always lead to the increase of the pressure drop across the fuel assembly.

The present invention relates to an alternative way of reducing the risk of wear on the fuel rods caused by foreign matter adhering to the upstream edge of the spacer.

SUMMARY OF THE INVENTION

According to one aspect of the present invention, a reduced risk of wear on the fuel rods by foreign matter is achieved by an alternative design of already known spacers. The invention is applicable to already-known spacers of the type comprising a grid structure of sleeves. By designing the upstream edge of such spacers with a wavy form, foreign matter captured towards the upstream edge of the spacer may be oriented such that it will not make contact with the elongated fuel rods positioned by the spacer.

The wavy edge is suitably made such that that part of the upstream edge, which is arranged adjacent another sleeve to be joined together with this sleeve in the grid structure of the spacer, encounters the upwardly-flowing coolant after the coolant has encountered the edge between the joints. In this way, any foreign matter is oriented such that it is arranged between the elongated elements transversely of the flow direction when being captured. The captured foreign matter will thus make contact with that part of the wavy edge which is disposed at the joint with adjacently located sleeves in the grid structure and diagonally across the flow channel which is formed between the sleeves in an orthogonal grid structure, thus as far away from the rod surfaces as possible.

In a particularly preferred embodiment of the invention, the sleeves are provided with elongated embossments adapted to coincide with that part of the edge which is arranged between the joints. The elongated embossments are adapted to substantially make contact with the fuel rods.

By forming the spacer with a wavy edge, it can be given a low flow resistance while at the same time foreign matter which adheres to the upstream edge of the spacer is efficiently captured and oriented such that it does not make contact with and thus does not cause wear on the elongated elements. The low flow resistance is achieved by making the flow-preventing transverse area in a cross section through that part of the space which is provided with the wavy edge smaller than in a spacer with a substantially straight edge.

BRIEF DESCRIPTION OF THE DRAWINGS

The invention will be most readily understood with reference to the accompanying drawings, wherein.

DESCRIPTION OF THE PREFERRED EMBODIMENTS

Figure 1A:
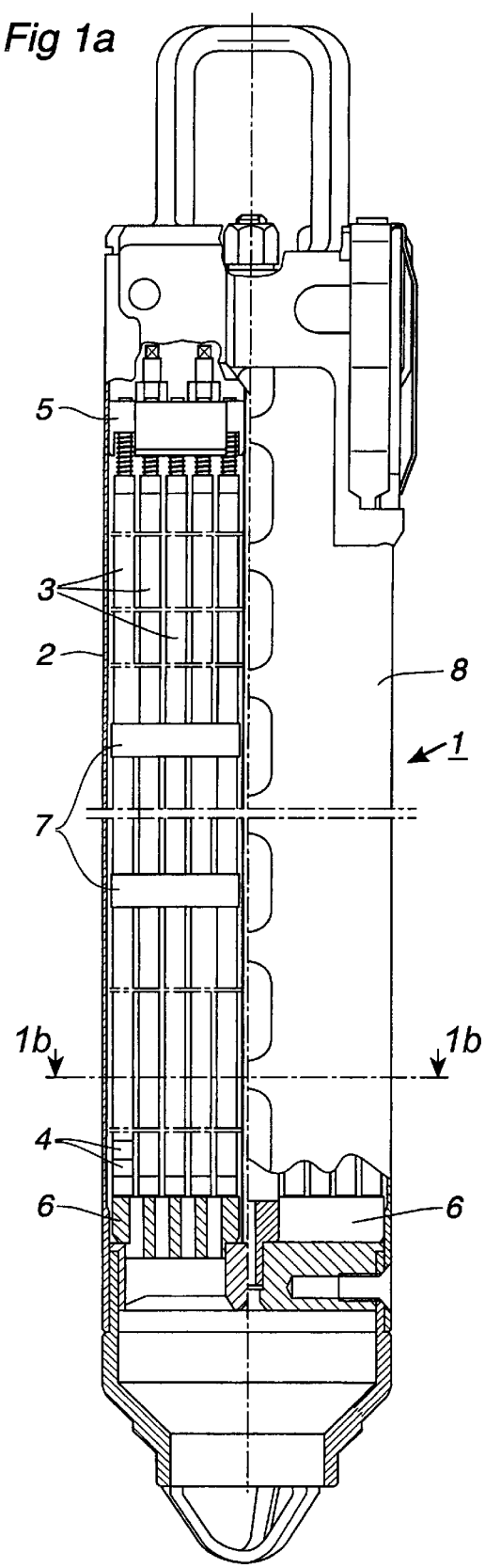
FIG. 1a shows in a section 1a—1a in FIG. 1b a boiling water fuel assembly with spacers.
Figure 1B:
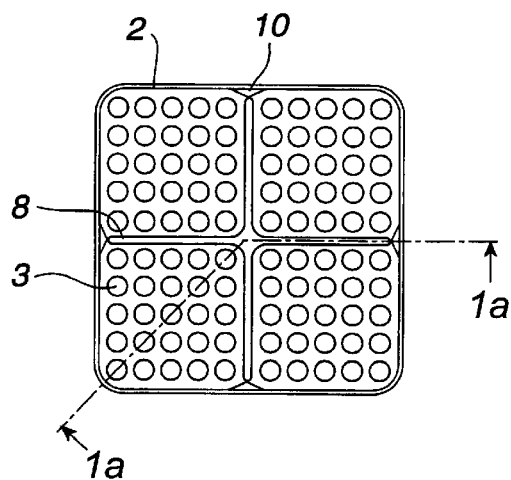
FIG. 1b shows in a section 1b—1b in FIG. 1a the same fuel assembly.

FIG. 1a shows a boiling water fuel assembly 1 which comprises a long tubular container, of rectangular cross section, referred to as fuel channel 2. The fuel channel 2 is open at both ends so as to form a continuous flow passage through which the coolant of the reactor flows. The fuel assembly 1 comprises a large number of equally long tubular fuel rods 3, arranged in parallel in a bundle, in which pellets 4 of a nuclear fuel are arranged. The fuel rods 3 are arranged spaced from each other in four orthogonal sub-bundles by means of a cruciform support means 8 (see also FIG. 1b). The respective sub-bundle of fuel rods 3 is retained at the top by a top tie plate 5 and at the bottom by a bottom tie plate 6. The fuel rods 3 in the respective sub-bundle are kept spaced apart from each other by means of spacers 7 and are prevented from bending or vibrating when the reactor is in operation. The spacer according to the invention may, of course, also be used in a boiling water reactor which lacks the cruciform support means 8 and instead is provided with, for example, one or more water tubes.

Figure 2:
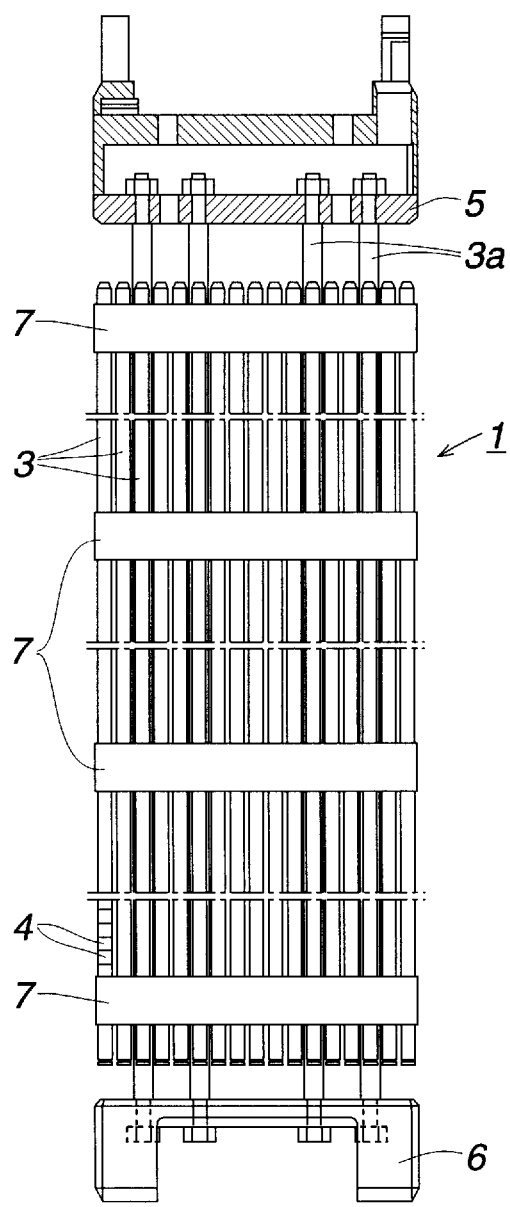
FIG. 2 shows a pressurized-water reactor fuel assembly with spacers according to the invention.

FIG. 2 shows a pressurized-water reactor fuel assembly 1 comprising a number of elongated tubular fuel rods 3 and control rod guide tubes 8 arranged in parallel. In the fuel rods 3, pellets 4 of a nuclear fuel are arranged. The control rod guide tubes 8 are retained at the top by a top nozzle 5 and at the bottom by a bottom nozzle 6. The fuel rods 3 are kept spaced apart from each other by means of spacers 7.

Figure 3:
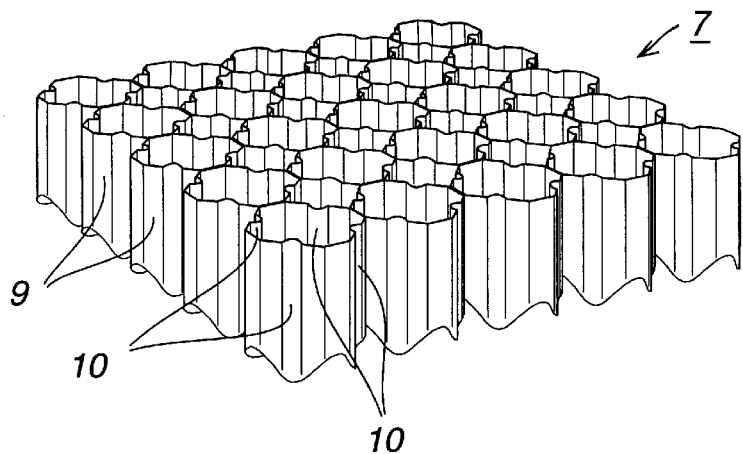
FIG. 3 shows in perspective view a spacer according to the present invention.

FIG. 3 shows the spacer 7 which comprises an orthogonal grid structure of sleeves 9. Each sleeve 9 is intended to position an elongated element 3 extending therethrough. The elongated element 3 may consist, for example, of a fuel rod or a control rod guide tube.

Figure 4:
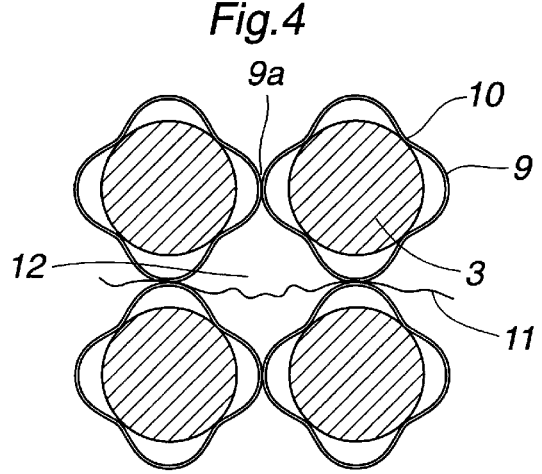
FIG. 4 shows in a view from above a fragment of a spacer according to the invention.

The sleeves 9 are thus intended to be joined together with other similar sleeves into a preferably orthogonal grid structure. At least the majority of the sleeves 9 are internally provided with four supports 10. The supports 10 comprise elongated embossments facing the center of the sleeve 9. The elongated embossments give an all-sided positioning of the elongated element 3 extending through the sleeve. The supports 10 are evenly distributed along the circumference of the sleeve 9. The supports 10 extend along the whole length of the sleeve. In FIG. 4 a fragment of the spacer according to FIG. 2 is shown in a view from above. This figure shows that the supports 10 position an elongated element 3 extending through the sleeve.

Figure 5:
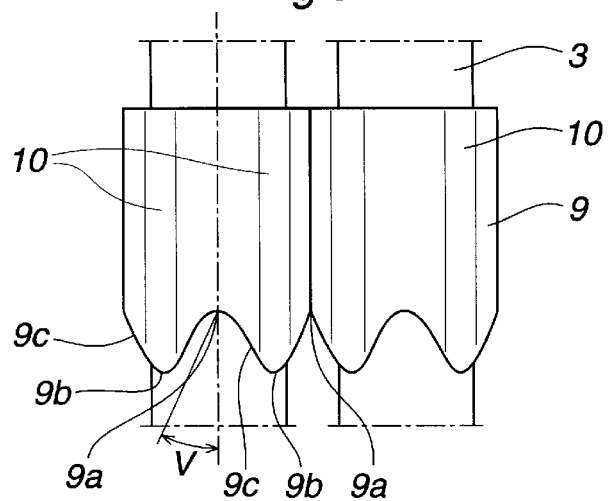
FIG. 5 shows the fragment according to FIG. 4 in a view from the side.

FIG. 5 shows the fragment in FIG. 4 in a view from the side. The upstream edge of the sleeve 9, in relation to the coolant flowing through the assembly, is provided with a wavy form. The wavy edge of the sleeve 9 is suitably made such that that part of the upstream edge 9a, at which the sleeve is joined to an adjacently located sleeve 9 in the grid structure of the spacer, encounters the upwardly-flowing coolant after the coolant has encountered the edge 9b disposed between the joints 9a. In this way, a foreign matter which adheres to the upstream edge of the spacer is oriented transversely of the flow direction and between the elongated element 3, that is, as far away from the surface of the elongated element 3 as possible. In FIG. 4, such a foreign matter 11, in the form of a wire cutting, is shown. The captured foreign matter 11 will thus be oriented so as to make contact with that part of the wavy edge 9a which is disposed at the joint with adjacently disposed sleeves 9 in the grid structure and substantially diagonally across the flow channel 12 which is formed between the sleeves in an orthogonal grid structure.

Because of the elongated and inwardly-facing supports 10, the upstream first edge 9b of the sleeve 9 is arranged making contact with the elongated element 3. In this way, foreign matter is prevented from passing in between the sleeve 9 and the elongated element 3. Oblique edges 9c, that is, edges forming an angle v with the axial direction of the spacer, are formed between the part edges 9a, 9b. The oblique edges 9c guide and orient the foreign matter so that it will make contact with the part edge 9a. In this way, the foreign matter which is stopped against the upstream edge of the spacer is diverted away from the surface of the elongated elements 3.

I claim:

1. A spacer for positioning elongated elements at one or a plurality of levels in a fuel assembly in a nuclear reactor, wherein a coolant flows upwards through said fuel assembly, said spacer comprising:

a grid structure comprising a plurality of sleeve cells joined together, a majority of said sleeves cells having an upstream edge with a wavy form having peaks and valleys, said peaks being disposed between joints at which said sleeves cells are joined together, said valleys being disposed at said joints at which said sleeve cells are joined together, and said peaks being arranged closer to a center of said sleeve cell than said valleys with oblique edges being formed between said peaks and valleys.

2. A spacer according to claim 1, wherein at least the majority of the sleeves are provided with four fixed supports in the form of elongated embossments facing inwards towards the center of the sleeve and being evenly distributed around the periphery of the sleeve cell and arranged such that the upstream edge of the supports corresponds to that peak which is arranged between the joints of the sleeves.

3. A fuel assembly for a nuclear reactor wherein a coolant is adapted to flow upwards through said fuel assembly, comprising:

a spacer for positioning elongated elements at one or a plurality of levels in said fuel assembly in a nuclear reactor, said spacer comprising:

a grid structure comprising a plurality of sleeve cells joined together, a majority of said sleeves cells having an upstream edge with a wavy form having peaks and valleys, said peaks being disposed between joints where said sleeves cells are joined together, said valleys being disposed at said joints where said sleeve cells are joined together, and said peaks being arranged closer to a center of said sleeve cell than said valleys such that oblique edges are formed between said peaks and valleys.

4. A spacer according to claim 3, wherein at least the majority of the sleeves are provided with four fixed supports in the form of elongated embossments facing inwards towards the center of the sleeve and being evenly distributed around the periphery of the sleeve cell and arranged such that the upstream edge of the supports corresponds to that peak which is arranged between the joints of the sleeves.

\* \* \* \* \*

UNITED STATES PATENT AND TRADEMARK OFFICE
CERTIFICATE OF CORRECTION

PATENT NO. : 5,875,223
DATED : February 23, 1999
INVENTOR(S) : Nylund

It is certified that error appears in the above-identified patent and that said Letters Patent is hereby corrected as shown below:

```
Column 4, line 14, change "sleeves" to --sleeve--.
        line 17, change "sleeves" to --sleeve--.
        line 37, change "sleeves" to --sleeve--.
        line 40, change "sleeves" to --sleeve--.
```

Signed and Sealed this

Twenty-fifth Day of May, 1999

Attest:

Q. TODD DICKINSON

*Attesting Officer*    *Acting Commissioner of Patents and Trademarks*